(12) United States Patent
Basu et al.

(10) Patent No.: US 9,917,977 B1
(45) Date of Patent: Mar. 13, 2018

(54) METHODS AND SYSTEMS FOR AUTOMATICALLY GENERATING OBJECT TYPE BASED ONE OR MORE CUT CONTOURS

(71) Applicant: XEROX CORPORATION, Norwalk, CT (US)

(72) Inventors: Chiranjib Basu, Kolkata (IN); Ranita Bej, Kolkata (IN); Arindam Das, Konnagar (IN)

(73) Assignee: XEROX CORPORATION, Norwalk, CT (US)

( * ) Notice: Subject to any disclaimer, the term of this patent is extended or adjusted under 35 U.S.C. 154(b) by 19 days.

(21) Appl. No.: 15/342,150

(22) Filed: Nov. 3, 2016

(51) Int. Cl.
  *H04N 1/32* (2006.01)
  *G06F 3/12* (2006.01)
  *G06K 15/02* (2006.01)

(52) U.S. Cl.
  CPC ....... *H04N 1/32144* (2013.01); *G06F 3/1204* (2013.01); *G06F 3/125* (2013.01); *G06F 3/1248* (2013.01); *G06F 3/1256* (2013.01); *G06K 15/1822* (2013.01); *G06K 15/1836* (2013.01); *G06K 15/1855* (2013.01); *H04N 1/32309* (2013.01); *H04N 2201/0094* (2013.01)

(58) Field of Classification Search
  CPC ........... H04N 1/32144; H04N 1/32309; H04N 2201/0094; G06K 15/1822; G06K 15/1855; G06K 15/1836; G06F 3/1256; G06F 3/1248; G06F 3/1204; G06F 3/125
  See application file for complete search history.

(56) References Cited

U.S. PATENT DOCUMENTS

| | | | | |
|---|---|---|---|---|
| 7,164,490 B2 * | 1/2007 | Manico | ................ | H04N 1/3872 358/1.15 |
| 7,463,274 B2 * | 12/2008 | Ueda | ...................... | G03B 29/00 347/171 |
| 7,649,651 B2 * | 1/2010 | Yoshimura | ........... | H04N 1/3872 358/1.9 |
| 8,270,039 B2 * | 9/2012 | Pinney | .................. | G06F 3/1204 358/1.15 |
| 9,067,435 B2 * | 6/2015 | Richmond | ........... | B41J 11/0015 |
| 9,233,569 B2 * | 1/2016 | Richmond | ........... | B41J 11/0015 |
| 2006/0210296 A1 * | 9/2006 | Sakata | ....................... | B41J 3/60 399/82 |

* cited by examiner

*Primary Examiner* — Kent Yip

(57) ABSTRACT

Disclosed herein are methods and systems for generating one or more cut contours based on object types. The method includes receiving from a user a print job including a first file having objects and receiving at least one object type and a cut width for printing the job at a printer. Based on the at least one object type, corresponding objects are extracted from the first file. Then, automatically cut contours are generated while creating a raster image for the extracted objects. The cut contour is generated at the cut width distance outside a boundary of each object. The cut contour then is embedded around each object in the raster image to generate a second file. The cut contour is embedded using a specific color. The second file including the cut contour in the specific color around each object is printed.

20 Claims, 11 Drawing Sheets

CONVENTIONAL APPROACH

METHODS AND SYSTEMS FOR AUTOMATICALLY GENERATING OBJECT TYPE BASED ONE OR MORE CUT CONTOURS

TECHNICAL FIELD

The presently disclosed subject matter relates to the field of printing, and more particularly to methods and systems for automatically generating one or more cut contours based on object types.

BACKGROUND

Printing devices, like multi-function devices, printers, are very common these days and are frequently used by people in their offices, homes or production printing houses for bulk printing. In hefty production printing houses like Free Flow Printing Server (FFPS), the application of using cut marks is well observed and very frequent. Before printing, a document or a job having one or more objects such as text, image or graphics is submitted. As per existing techniques, a cut mark is given only at corners of each page of the document or at an edge. Though there can be reasonable requirements where a printer technician may be asked to print only objects of similar type from a PDL (Page Definition Language) supported document. For example, the printer technician may be asked to have individual cut marks for all the graphic objects. In such scenarios, technician may be left with only one option that is to manually edit the job by drawing trim lines around all the graphic objects to make a printer understand where to print the trim lines or a cutting device to understand where to cut. The edited job then is submitted to the printer for generating the trim lines. This increases a lot of manual effort.

Moreover, all the objects included in the document are printed by default, even not intended by the user. For example, if the document includes two objects such as text type and an image type but the user wishes to print or cut only the image type object, this is not possible in the existing techniques. In fact, the entire document is processed (rasterization, extraction, etc.) using the existing techniques; this seems an inefficient way and further increases time and cost. In addition, the existing techniques do not generate cut marks based on object types like images, text, graphics, etc. And there can be requirements where the user wants to print and cut all the objects separately from each other. Hence, in light of the limitations, there arises a need for improved methods and systems for automatically generating one or more cut contours based on object types such that each object is retrieved individually.

SUMMARY

According to aspects illustrated herein, there is provided a method for generating one or more cut contours for one or more objects based on object types. A print job including a first file is received from a user. Then, at least one object type, and a cut width for printing the job is received from the user via a user interface of a printer. Based on the at least one object type, one or more objects corresponding to the at least one object type, are extracted from the received first file. Then, one or more cut contours are automatically generated while creating a raster image for the extracted one or more objects. The cut contour is generated at the cut width distance outside a boundary of each object. Thereafter, the cut contour is embedded around each object in the raster image to generate a second file. The cut contour is embedded using a specific color around each object. Finally, the second file having the cut contour in the specific color around each object, is printed.

According to another aspect, there is provided a printer for printing one or more cut contours for one or more objects, based on object types. The printer includes a transceiver configured to: receive from a user a print job including a first file, the first file includes one or more objects; and receive from the user via a user interface of the printer, at least one object type and a cut width for printing the job. The printer further includes a raster image processor (RIP) configured to: detect and extract one or more objects corresponding to the at least one object type, from the receiving first file; automatically generate one or more cut contours while creating a raster image for the extracted one or more objects, the cut contour is generated at the width distance outside a boundary of each object; and embed the cut contour around each object in the raster image to generate a second file, the cut contour is embedded using a specific color for each object. The printer further includes a print engine configured to print the second file including the cut contour in the specific color embedded around each object.

According to yet another embodiment of the present disclosure, there is provided a system for automatically cutting objects based on object types. The system includes a printer having one or more components configured to receive via a user interface of the printer, at least one object type and a cut width corresponding to a job, the job includes a first file having one or more objects. The printer further extracts one or more objects from the job based on the at least one object type as input by the user. The printer further automatically generates one or more cut contours while creating a raster image for the extracted one or more objects, the cut contour is generated at the width distance outside the boundary of each object. The printer further embeds the cut contour around each object in the raster image to generate a second file, wherein the cut contour is embedded using a specific color. Finally, the printer prints the second file including the cut contour in the specific color embedded around each object. The system includes a cutting device that is configured to receive the color information of the cut contour for each object. The cutting device further receives the printed file and scans the printed file to identify the cut contour in the specific color embedded around each object. Finally, the cutting device cuts each object based on the identified cut contour for each object in order to retrieve each object individually.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
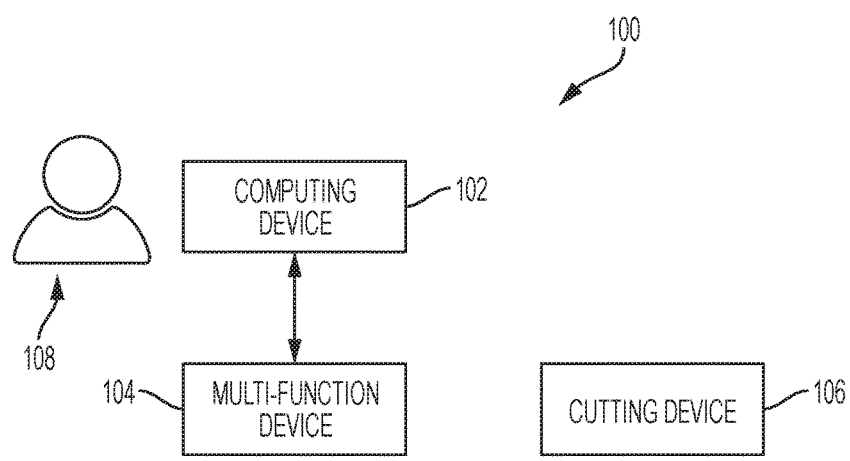
FIG. 1 shows an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Definitions

Definitions of one or more terms that will be used in this disclosure are described below without limitations. For a person skilled in the art, it is understood that the definitions are provided just for the sake of clarity, and are intended to include more examples than just provided below.

A "multi-function device" is a single device or a combination of multiple devices configured to perform more than one function such as, but not limited to, scanning, printing, imaging, and so forth. The multi-function device may include software, hardware, firmware, and combination thereof. The multi-function device may interchangeably be used with the phrase "printer" or "printer device." In the context of the current disclosure, the multi-function device is configured to automatically generate one or more cut contours for one or more objects, based on object types.

A "document" or a "file" refers to a soft copy of a pre-defined format including one or more objects. Here, the document is a page description language (PDL) supported document but other suitable formats may be implemented for the current disclosure.

A "first file" refers to a file as received from a user. The first file includes one or more objects. A "second file" refers to a file including the cut contour embedded in the specific color, around each object.

As used herein, a "cut-contour" refers to a die line or a cut line around a boundary of an object and is generated based on object type or shape. The cut contour is used for cutting purposes. The cut contour may be interchangeably be used with the phrase "cut mark," "cut line," or "die line," without limiting the scope of the disclosure.

Further, as used herein, a "cutting device" may be an independent device or a part of the multi-function device. In the context of the current disclosure, the cutting device is configured to cut one or more objects based on cut contours as generated by the multi-function device in order to retrieve individual object.

A "cut width" is a distance outside the boundary of an object. The cut width is provided by the user.

Overview

As per existing techniques, if a user wishes to cut particular object types from any PDL document then the current techniques do not allow users to get individual objects as the current techniques generate cut marks only at each corner of the document. In such cases, the user takes the entire printed document and cut intended objects manually. The current disclosure overcomes the mentioned limitations by allowing the user to select types of objects and automatically generate cut contours around the selected objects and finally retrieved the intended objects. In detail, the present disclosure provides systems and methods for automatically generating cut contours (or die lines) around individual objects in a file to be printed. The cut contours are generated based on the object types. These cut contours help a cutting device to understand the exact location/position from where to cut to get individual objects. More details will be discussed below.

Exemplary Embodiments

The primary aim of the disclosure is to cut objects from its surfaces to get individual objects. To this end, methods and systems cut the objects of user selected type by generating cut contours that are easily recognized by a cutting device so that there is no manual effort required in individual object cutting.

FIG. 1 is an exemplary environment 100 in which various embodiments of the disclosure can be practiced. The environment 100 includes a computing device 102, multi-function device 104, and a cutting device 106. As shown, the computing device 102 is connected to the multi-function device 104 through a network (although not shown). The network may be a wired network, a wireless network, or a combination of these. Examples of the network may include such as, but are not limited to, a personal area network (PAN), a local area network (LAN), a Bluetooth® network, a storage area network (SAN), a home area network (HAN), the Internet®, a campus area network (CAN), a wide area network (WAN), a metropolitan area network (MAN), a virtual private network (VPN), an enterprise private network (EPN), Internet, a global area network (GAN), public switched telephone network (PSTN), cellular telephone network, or any other terrestrial or satellite network appropriate.

A user 108 uses the computing device 102 for his day-to-day tasks such as emails, surfing, work, chat, etc. Examples of the computing device 102 may include, but are not limited to, a computer, a laptop, a smart phone, a mobile phone, a tablet computer, a PDA (Personal Digital Assistant) and so forth. Using the computing device 102, the user 108 sends a document or a file to be printed to the multi-function device 104. The file includes one or more objects such as image, graphics, text or a combination of these. In one example, the file may include all text, while in other example, the file may include a combination of object types such as graphics and text. The file to be printed is in a pre-defined format. One such example is PDF format, however, any other existing or later developed PDL supported formats can be implemented for the current disclosure. The file having the one or more objects can be referred to as a first file.

In one embodiment, the first file may be pre-stored at the multi-function device 104, while in other embodiments, the first file may be downloaded from the Internet or received from other suitable devices.

Upon receiving the file, the multi-function device 104 receives an input from the user 108 including an object type and a cut width. The multi-function device 104 further processes the file to detect and extract one or more objects corresponding to the object type as input by the user as well as processes the cut width to generate a second file. The second file includes one or more cut contours corresponding to the one or more objects. In particular, the cut contour is generated for each object as extracted. For each object, the cut contour is generated in a specific color for easy recognition by the cutting device 106. The multi-function device 104 generates an output i.e., prints the second file including the cut contour around each object.

Figure 2A:
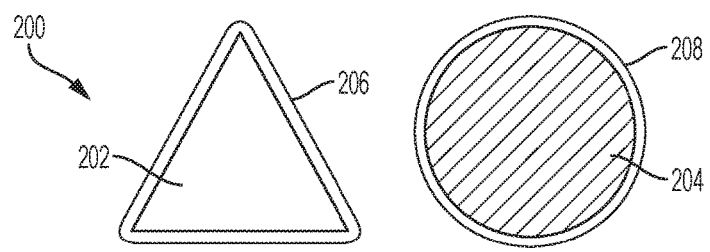
FIG. 2A shows cut contours generated according to the implementation of the current disclosure.
Figure 2B:
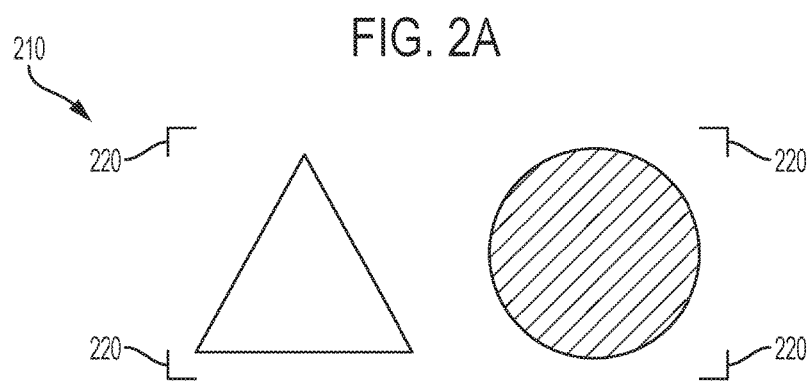
FIG. 2B shows cut marks generated according to conventional approach/methods.

One example of the printed file 200 is shown in FIG. 2A. It can be considered that the file 200 is a one page job. The printed file 200 includes two objects marked as 202 and 204. According to the present disclosure, cut contours shown as 206 and 208 are generated around the objects 202, and 204 respectively. These cut contours 206 and 208 are generated based on shape of individual objects 202 and 204 and these cut contours ultimately help to have individual objects retrieved from the file 200 at the time of cutting. While according to conventional approach as shown in FIG. 2B, an output printed file 210 is shown. The output printed file 210 includes cut marks shown as 220 at each corner. In this conventional approach, the individual objects cannot be retrieved at the time of cutting.

Referring to FIG. 1, the printed file is loaded to the cutting device 106 for cutting purpose. The cutting device 106 receives the file and performs scanning to detect cut contour around each object based on the specific color of the cut contour. Based on the detected cut contour, the cutting device 106 cuts each individual object. In this manner, the user can have individual objects retrieved.

As shown, the cutting device 106 is an independent device, however, the cutting device 106 may be a part of the multi-function device 104. The cutting device 106 may be present at the same location of the multi-function device 104. Alternatively, the cutting device 106 may be located remotely from the multi-function device 104. Any working or additional details related to the cutting device 106 remain the same as known and does not necessarily interfere the operation of the current disclosure.

Although the disclosure is discussed for printing a number of cut contours, but it is to be understood that the present disclosure may be implemented to extend to generation of the cut contours image planes, independent of a printed document, to feed a die cut workflow. The disclosure results in significant reduction in effort when compared to manual generation of cut contours around objects in a document using various document preparation tools.

Figure 3:
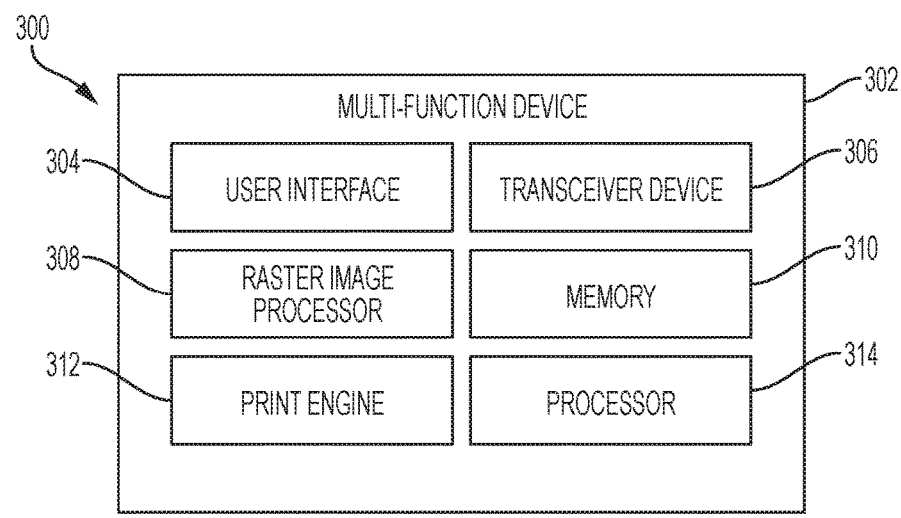
FIG. 3 is a block diagram illustrating various system elements of an exemplary multi-function device, in accordance with an embodiment of the present disclosure.

FIG. 3 shows various components of a device 300 such as a multi-function device 302 for generating as well as printing one or more cut contours for one or more objects, based on object types. The cut contours help to pull out individual objects as required by the user.

As shown, the multi-function device 302 includes a user interface 304, transceiver device or transceiver 306, a raster image processor (RIP) 308, a memory 310, a print engine 312 and a processor 314. Each of the components 304-314 is connected to each other via a conventional bus or a later developed protocol. Further, each of the components 304-314 communicates with each other for performing various functions of the current disclosure.

Initially, it is considered that the user has a file such as PDL supported file, including one or more objects and is submitted to the multi-function device 302 for printing. The objects may be of same type, for example, all objects may be text, graphic, or image. Alternatively, the objects may be of different types. For example, the objects may be a combination of text and image, or may be a combination of graphic and image and so on. Each object has a boundary or a border that defines the object. The objects may be of regular shape, irregular shape, or a combination of these. The object may represent a cartoon, an art work, triangle, a circle, a sticker, a design, a combination of these and so forth. The disclosure may be implemented for any types of objects or any additional details related to the objects or their types do not necessarily affect the implementation of the current disclosure.

As shown, the user interface 304 is configured to enable the user to perform one or more functions such as scanning, printing, copying, change settings, and so forth. In context of the current disclosure, the user interface 304 is used for providing an input such as a cut width and type of object and this will be discussed in more detail below.

The cut width may be any suitable numeric value such as in millimeter or in inches. The cut width may be same for all types of objects as input by the user, while the cut width may be different for different types of objects. For example, the cut width may be different for image objects, while the cut width may be different for graphic objects. And further to this, the cut width may be different for various objects of same types. For example, if there are two objects of type image, each of the two image objects may be assigned a different cut width, say 10 and 13. In many implementations, the cut width may be same for all types of objects as input by the user. The cut width value may then be converted into pixels by the raster image processor 308.

The transceiver 306 is configured to receive the file containing the one or more object such as image, text, graphic or a combination of these. The file is received from the user via a computing device (not shown in FIG. 3). Alternatively, the file may be pre-stored at the multi-function device 302. The file may also be downloaded from the Internet or may be provided via an external device such as USB. The file can be of any format such as PDF, JPEG, or any other PDL supported format, etc. The file may include a single page or may have multiple pages. The user wishes to print and finally cut one or more objects from the file—may be for bulk printing or printing otherwise. The transceiver 306 sends the file to the memory 310 for storage and to the raster image processor 308 for processing.

The memory 310 is configured to store the file in a suitable manner. Other details such as a cut width, object type or any other input as provided by the user may be stored in the memory 310.

Upon receiving, the multi-function device 302 requests the user to provide the input before processing or printing the file. The input includes an object type to be printed and a cut width. For example, the user may want to print all objects of type image. In other example, the user may want to print all objects in the file. The cut width defines the distance between the cut marks and the boundary of the objects. Further, the cut width is a numeric value. In cases, where the user does not provide the cut width, the very next pixels of the boundary of each object may be considered as cut width for the objects. The very next pixels of the boundary of each object gets cut contours applied. For example, the user 108 may provide a cut mark width (or a cut width), for example, 2 millimeter, and an object type "image" from one or more tabs and dropdown menus via the user interface 304 of the multi-function device 302.

Upon receiving the input from the user, the raster image processor (RIP) 308 detects one or more objects corresponding to the object type as input by the user. For example, if the user provides image as object type, the raster image processor 308 detects all image objects from the file. Before rasterization, the raster image processor 308 assigns an identifier to each detected object. The object identifier (ID) helps the user identify a particular object in the user interface 304 and perform one or more functions such as providing a different cut width for each object, selecting/deselecting any particular object or the like. The raster image processor 308 then extracts all the images from the file and creates a raster image (into pixels format) based on the extracted objects.

The raster image is created only for the extracted objects, for example, image objects and other objects such as text, graphics are not processed by the raster image processor 308. Along with this, the raster image processor 308 converts the cut width into equivalent pixels. These pixels are left outside from the boundary of the extracted objects.

The raster image processor 308 then generates a cut contour for each object. The cut contour is defined or honored around each object by leaving the number of pixels around each object such that the distance between a cut contour and the object is equivalent to the cut mark width (or a cut width). The raster image processor 308 further embeds the cut contour around each object in the raster image to generate a second file. The cut contour is embedded using a specific color such as, but not limited to, blue, green, red, and so forth. In this manner, the cut contour is generated around each object. Here, the second file is sent to the print engine 312.

Before printing, the raster image processor 308 generates a preview of the second file presenting the cut contour around each object to ascertain whether the contour matches the intent of the user. The user can see the preview through the user interface 304 of the device 302. The user is given an option to export the preview content into a suitable format such as, but not limited to, a PDF file (in Acrobat or other editing tools), where the cut contour is emitted in a specific separation color space. Few examples of tools for editing the second file may include, but are not limited to, Photoshop, CAD software, XPS document, PostScript, CorelDraw file and so forth. The user then may open the PDF file using a suitable editing tool (or software) and may make necessary corrections to the emitted cut contour. Further, the user may edit the second file, for example, may change appearance or a position of the contour or the user may just approve the preview if he/she doesn't wish to make any changes in the second file. Thereafter, the user may submit or save the edited PDF file at the multi-function device 302 for further processing. The raster image processor 308 may detect an existence of the one or more cut contours in the edited PDF file and may treat the cut contours as final contours. In this resubmission, the multi-function device 302 may not add any further automatic cut contours.

If the user wishes to edit the preview as mentioned, the edited second file is sent to the print engine 312, else the second file as generated by the raster image processor 308 is sent to the print engine 312

In some implementations, the raster image processor 308 may highlight specific types of objects in different color such as text content is highlighted in RED color, while the graphics content may be highlighted in a different color such as BLUE. The same may be displayed to the user while processing the input via the user interface 304. This is done for easy recognition of type of object by the user.

The print engine 312 prints the second file including the embedded cut contour around each object in the specific color. The printed file includes the cut contour in the specific color around each object. Here, the specific color information etc. (i.e., tint value) is sent by the multi-function device 302 to the cutting device or the cutter. To this end, the cutter identifies the color value and considers the corresponding color value as the cut contour. For example, the cutter identifies the exact location, where the tint value is matched. The tint value can be set by any one operator or otherwise received from the multi-function device 302. In many implementations, sample of the cut contour color may be sent to the cutter for easy identification.

Once printed, the printed file is loaded to a cutter (although not shown). The cutter is configured to first scan the loaded file to identify the cut contour around each object. Using the specific color of the cut contour or the color information, the cutter identifies the cut contour around each object. The cutter then cuts each individual object based on the identified cut contour and in this manner individual objects are retrieved as required by the user.

For better understanding, FIG. 3 is explained considering a single file or job, however, for a person skilled in the art, it is understood that the disclosure can be implemented for multiple files or jobs. In such cases, the processor 318 manages and executes multiple job requests as received from a user or multiple users.

In case of bulk jobs to be submitted (for example 1000 files), the user may submit the print jobs through various printer gateways such as LPR (Line Printer Remote) protocol. To this end, the LPR gateway enables the print requests to be temporarily stored in a print spooling directory before submitting them to a remote print server for printing. In one example, the input may be embedded within the PDL supported document such as a cut width value and the object type to be processed further. In another example, a script may be written including job properties having a cut width value and object types to be selected for further processing. The bulk jobs may be stored in a shared location which can be accessed by the print server. While accessing, the server retrieves job properties from the script or from the PDL supported document for further processing as discussed above in detail. Various formats of the print jobs may be doc, docx, ppt, pptx, or any other formats supported by PDL files.

Figure 4A:
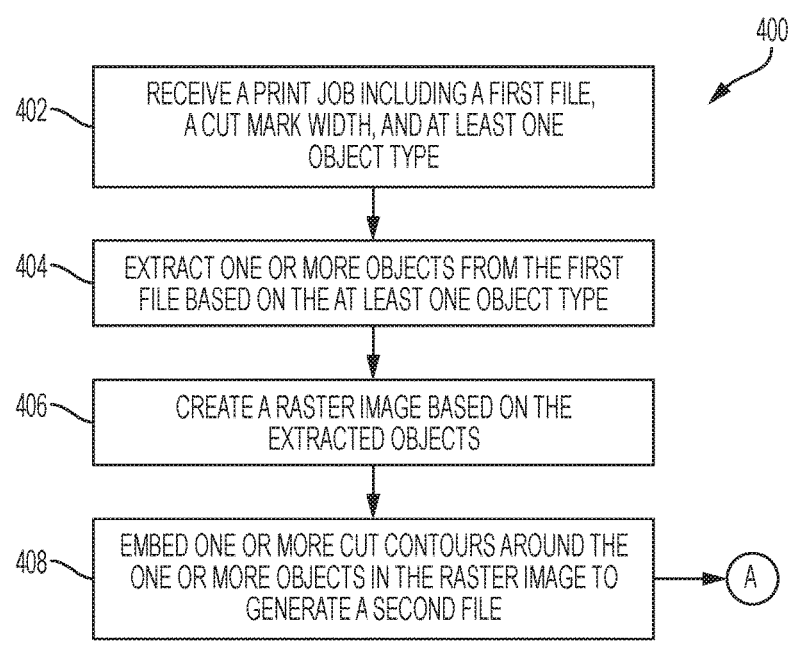
FIGS. 4A-4B represent a method flowchart for automatically generating one or more cut contours around one or more objects.
Figure 4B:
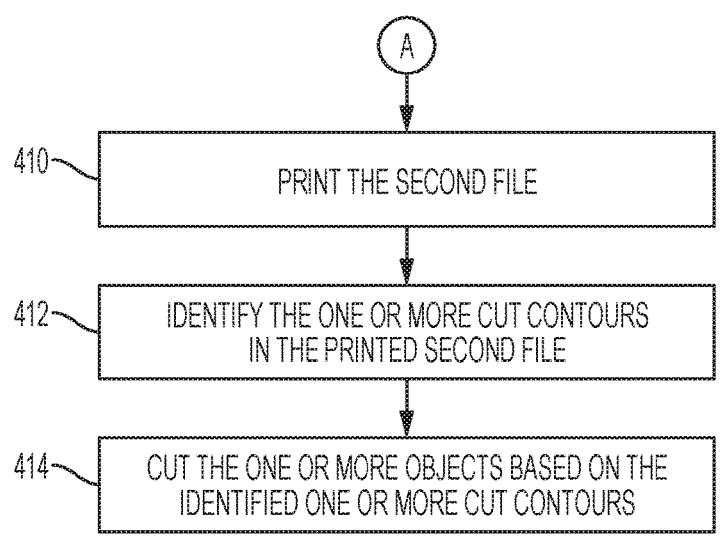

FIGS. 4A-4B represent an exemplary flowchart 400 for printing a document including one or more cut contours, in accordance with an embodiment of the present disclosure.

At 402, a print job including a first file to be printed, a cut mark width (or a cut width), and at least one object type is received at a multi-function device. The first file includes one or more objects of same type or different types. The print job is received from a user via a computing device. The first file to be printed may be a pre-stored file at the multi-function device. The cut mark width and the at least one object type are provided by the user at the multi-function device. More particularly, the user provide the details via the user interface of the multi-function device.

At 404, one or more objects are extracted from the first file based on the at least one object type. For example, if the user provides text as input, the all text type objects are selected and then extracted. Other object types such as graphics or images are not considered for processing (i.e., extraction, rasterization) and thus, saves a lot of time.

Then at 406, a raster image is created based on the extracted one or more objects. Thereafter at 408, one or more cut contours are embedded around the objects in the raster image to generate a second file. The cut contour is embedded around each object using a specified color such that a distance of the cut contour from each object is equal to the cut mark width.

A preview of the second file including the one or more cut contours is generated. The preview enables the user to preview the cut contours to see if the generated cut contours matches his/her intent. In the preview, the selected objects based on the received object type are shown along with an object identifier (ID). The object identifier may be unique for each of the objects and the object identifier of each object may be enlisted within a preview window with check boxes. The user may check or uncheck to select and deselect an object respectively using the check boxes. By default, all the check boxes may remain checked. For example, when the user wants to remove one or more objects or does not want to have cut contours applied on certain objects and from print, then the user may uncheck a box corresponding to an object ID of the corresponding object. If the user wishes, the user may edit the second file from the preview.

In some embodiments, in the preview window, the user may define a different cut mark width (or a cut width) for different objects. The user may edit the second file for changing placement of at least one of the one or more cut contours. The user may change appearance or a position of one or more of the contours or the user may just approve the preview if he/she doesn't wish to make any changes in the second file. Here, the user may be given an option to export the preview content into a suitable format such as, but not limited to, a PDF file (in Acrobat or other editing tools), or any PDL supported file, where the cut contours may be emitted in a specific separation color space. The user then may open the PDF file and may make necessary corrections to the emitted cut contours. Thereafter, the user may submit or save the edited PDF file at the multi-function device for further processing. The multi-function device may detect an existence of the one or more cut contours in the edited PDF file and may treat the cut contours as die lines. In this resubmission, the multi-function device may not add any further automatic cut contours. In such embodiment, the multi-function device may be configured to print the edited second file. The multi-function device may print the cut contours using a specific colored ink.

Then at 410, the second file is printed. In cases where the user edits the second file, the edited second file is printed. Then at step 412, the one or more contours in the printed second file are identified. Specifically, the cut contour around each object in the printed file, is identified.

Then at 414, the one or more objects present in the printed second file are cut based on the identified one or more cut contours. In some embodiments, the cutting device 216 cuts the one or more objects.

For better understanding of the disclosure, the disclosure is explained with respect to a multi-function device. But for a person skilled in the art, it understood that the disclosure can be implemented by a printer or any equivalent device without limiting the scope of disclosure.

Special Case

In cases where the first file includes two or more objects which are adjacent to each other and there is no enough space to honor individual cut contours around each object, then the two or more objects are considered as a single object. Accordingly, a cut contour is generated considering the two or more objects as a single object.

Figure 5A:
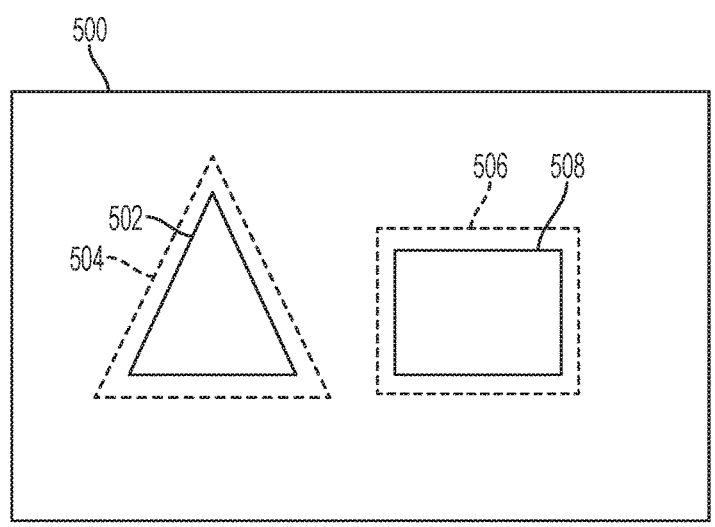
FIGS. 5A-5C illustrate exemplary printed files including objects having cut contours around them.
Figure 5B:
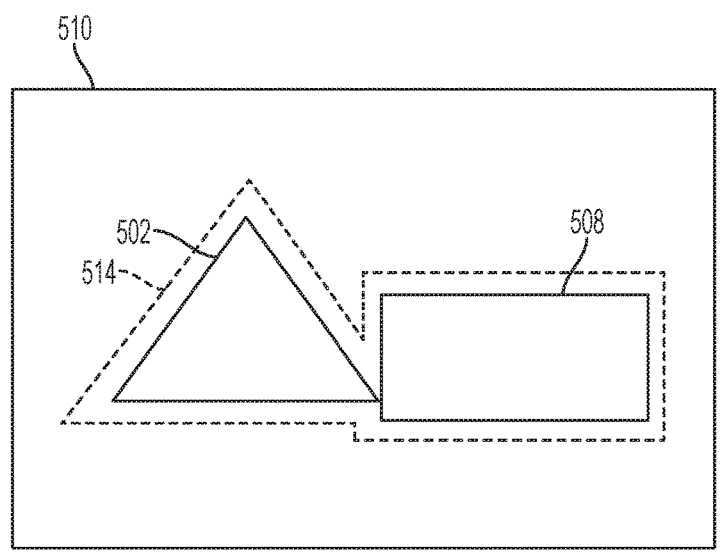

FIGS. 5A-5B illustrate output generated according to the current disclosure. The output includes a printed page 500 including objects with cut contours around them. As shown in FIG. 5A, an object 502 and an object 508 of an object type image are printed on the page 500. The object 502 is triangle in shape and the object 508 is rectangle in shape. Here, the cut contours 504, 506 are generated for each individual object 502 and 508. As seen from FIG. 5A, the cut contour 504 is generated according to the shape of the object 502. Similarly, the cut contour 506 is generated according to shape of the object 508.

Figure 5C:
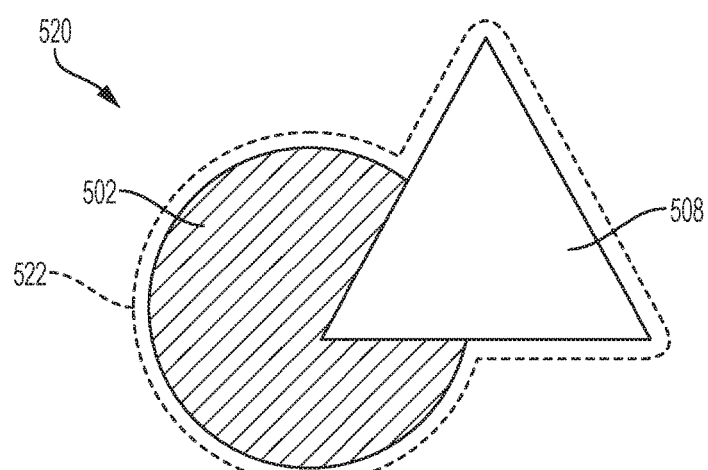

Turning now to FIG. 5B, a file 510 including an object 502 and an object 508 is shown. The file 510 includes two adjacently placed objects 502 and 508 and distance between the two objects 502 and 508 is less than the cut mark width. As per the disclosure, the methods and systems consider both the objects 502 and 508 as one object and combines both into a single object. Accordingly, a cut contour 514 is generated around the single object. The cut contour follows the boundary of the object or the cut contour is bended as per the boundary of the object or the shape of the object. Similarly, in the snapshot 520 of FIG. 5C objects 502 and 508 are overlapping and are considered as a single object and a cut contour 522 is generated around the objects 502 and 508.

Figure 6A:
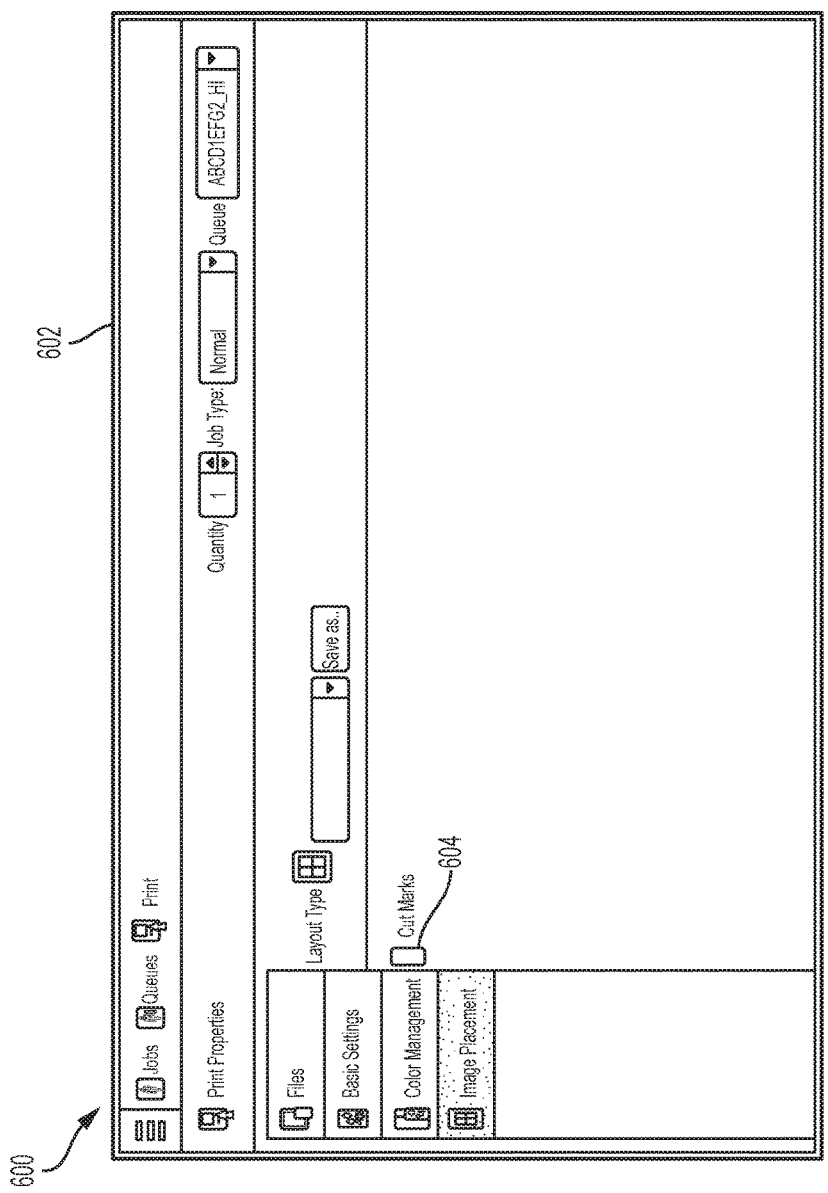
FIGS. 6A-6C illustrate exemplary screenshots of a user interface, for providing inputs (i.e., a cut width and object type), in accordance with an embodiment of the disclosure.
Figure 6B:
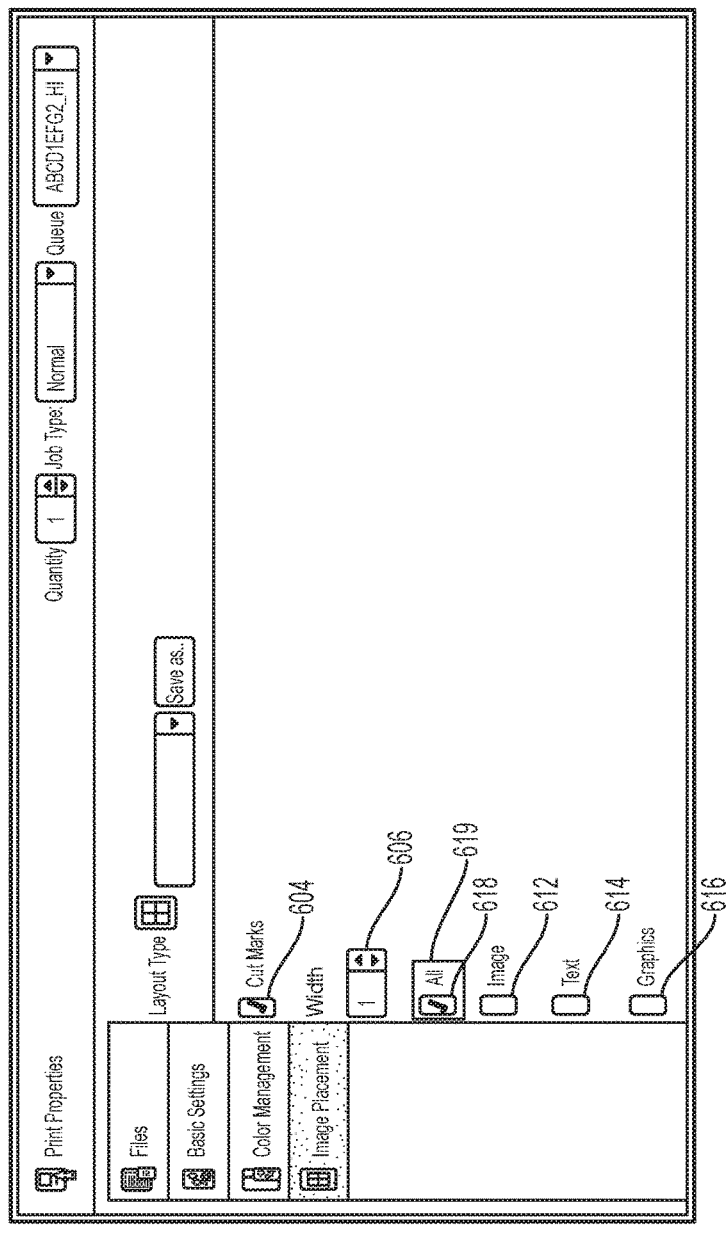
Figure 6C:
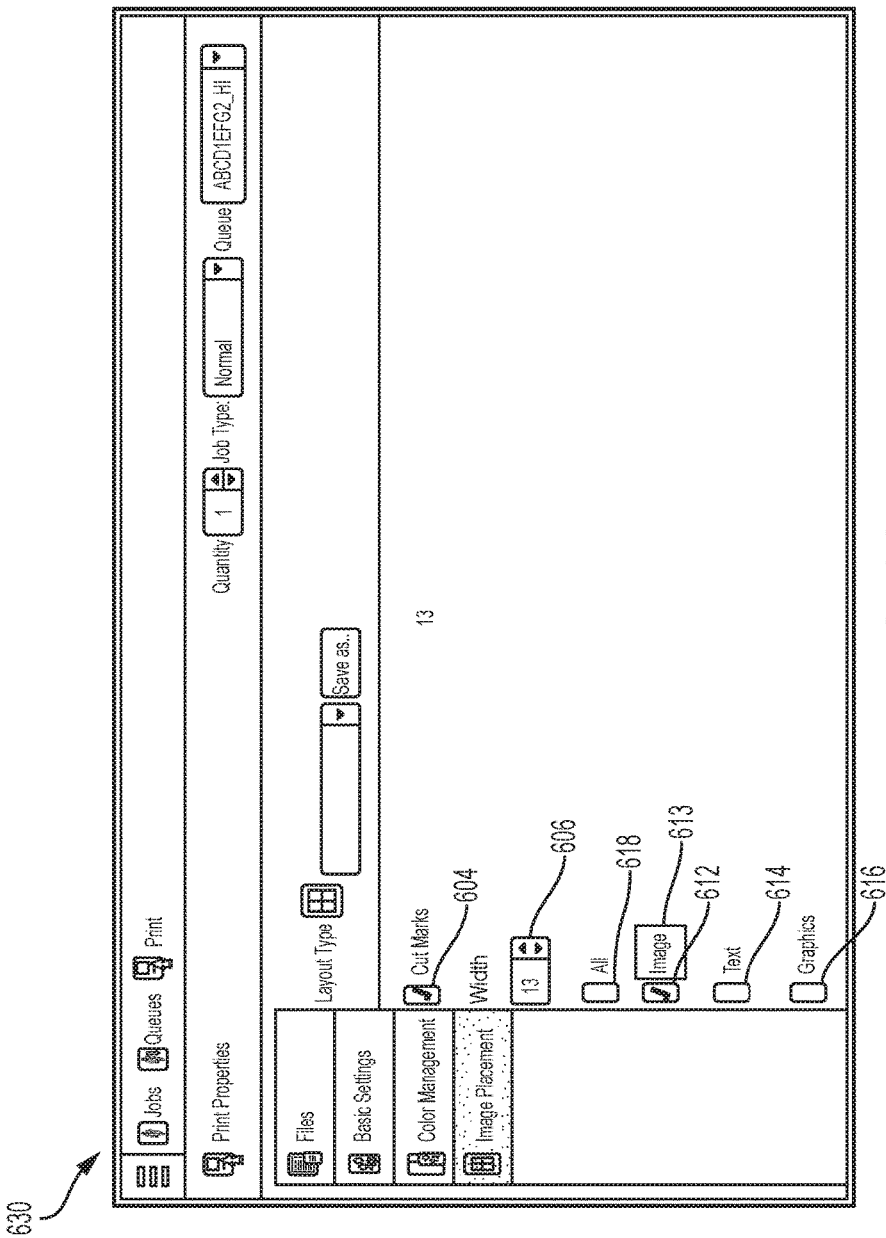

FIGS. 6A-6C illustrate screenshots of a user interface at a multi-function device. As shown in the snapshot 600 of FIG. 6A, the user interface 602 includes multiple options and a "Cut Marks check Box" marked as 604. When a user wants to print a file with cut contours, then the user selects the "Cut Marks Selection Box," marked as 604 in FIG. 6A. The user interface 602 further shows an input box 606 for providing a cut width by the user. Here, the user can provide different cut width for different object type. As shown in the snapshot 610 of FIG. 6B, the user provides the cut width as "1" for all types of objects, whereas the user provides the cut width as "13" for image types of objects, as shown in the snapshot 630 of FIG. 6C. The user interface 602 also allows the user to choose which object he or she wishes to process from the file. For example, all object types are shown in the user interface 602 such as "Image" marked as 612, "Text" marked as 614, "Graphic" marked as 616 and "All" marked as 618. The user selects "All" options marked as 618 object types in FIG. 6B, whereas the user selects "image" object 612 as per FIG. 6C. The selection is shown as 619 in FIG. 6B and the selection is shown as 613 in FIG. 6C.

The disclosure may be implemented for sticker printing such as Duck Tales, Mickey Mouse, or the like. Further, the disclosure may be implemented in a print shop environment, production printing or the like.

The present disclosure discloses methods and systems for automatically generating as well as printing cut contours. The cut contours are generated automatically, therefore a lot of manual effort is saved and chances of human error are nearly zero. The methods and systems allow a user to provide input in terms of cut width and object type, and thus the disclosure is user driven. The methods and systems do not have any dependency on hardware. The methods and systems process only objects, which are intended by the user, and thus, a significant amount of time and cost is saved. For example, only objects of a specific object type may get printed and rest of the content of the file to be printed may be ignored. This in turn may result in significant reduction in ink required for printing. Also, the disclosure provides an intelligent and automatic way of cutting objects which are desired by the user instead of all objects in the file. In all, the approach of the disclosure is time and toner cost saving approach. As opposed to the existing methods, the current disclosure does not require manual cutting of objects. The disclosure is useful for all scenarios where a document of pre-defined type is available i.e., PDL and specific type of objects need to be cut from such documents. One such scenario is sticker printing industry. In other words, the disclosure is useful when the specific object types need be to be cut as individual entity. The output of current disclosure can be fed into any of these down machineries on requirement (be it folder or packer) without breaking existing workflow of these down machineries.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for generating one or more cut contours for one or more objects, based on object types, comprising:
 receiving from a user a print job comprising a first file, the first file includes one or more objects;
 receiving from the user via a user interface of a printer, at least one object type and a cut width, for printing the job;
 based on the at least one object type, extracting one or more objects corresponding to the at least one object type as input by the user;
 automatically generating one or more cut contours while creating a raster image for the extracted one or more objects, the cut contour is generated at the cut width distance outside a boundary of each object;
 embedding the cut contour around each object in the raster image to generate a second file, wherein the cut contour is embedded using a specific color for each object; and
 printing the second file comprising the cut contour in the specific color around each object.

2. The method of claim 1, wherein the at least one object type comprises: text, image and graphics.

3. The method of claim 1, further comprising detecting one or more objects corresponding to the at least one object type as input by the user.

4. The method of claim 1, further comprising analyzing the first file to assign an identifier to each object, based on at least one type as input by the user.

5. The method of claim 1, further comprising generating a preview of the second file before printing, the preview displays the cut contour embedded around each object.

6. The method of claim 5, further comprising enabling the user to export the second file in a pre-defined format for editing.

7. The method of claim 1, further comprising loading the printed file to a cutting device.

8. The method of claim 7, further comprising:
 scanning the printed file to identify the cut contour in the specific color corresponding to each object; and
 cutting each object present in the printed file based on the identified cut contour.

9. The method of claim 1, further comprising converting the cut width into equivalent pixels for generating the cut contour around each object.

10. The method of claim 1, further comprising sending the color information of the cut contour to the cutting device for processing the printed file.

11. The method of claim 1, wherein the first file is a PDL supported file.

12. The method of claim 1, wherein the cut width is different for each object of different type.

13. A printer for printing one or more cut contours based on object types, comprising:
 a transceiver configured to:
  receive from a user a print job comprising a first file, the first file includes one or more objects; and
  receive from the user via a user interface of the printer, at least one object type and a cut width for printing the job;
 a raster image processor (RIP) configured to:
  based on the at least one object type, detect and extract one or more objects corresponding to the at least one object type;
  automatically generate one or more cut contours while creating a raster image for the extracted one or more objects, the cut contour is generated at the width distance outside a boundary of each object; and
  embed the cut contour around each object in the raster image to generate a second file, wherein the cut contour is embedded using a specific color; and
 a print engine configured to print the second file comprising the cut contour in the specific color embedded around each object.

14. The printer of claim 13, wherein the raster image processor is configured to generate a preview of the second file before printing, the preview indicates the cut contour embedded around each object.

15. The printer of claim 13, wherein the second file is downloaded by the user in a pre-defined format for editing.

16. The printer of claim 13, wherein the printed file is loaded to a cutting device.

17. The printer of claim 13, wherein the raster image processor is configured to convert the cut width into equivalent pixels for generating the one or more cut contours.

18. A system for automatically cutting objects based on object types, comprising:
 a printer having one or more components configured to:
  receive via a user interface of the printer, at least one object type and a cut width corresponding to a job, the job includes a first file having one or more objects;
  extract one or more objects from the job based on the at least one object type as input by the user;
  automatically generate one or more cut contours while creating a raster image for the extracted one or more objects, the cut contour is generated at the width distance outside a boundary of each object;
  embed the cut contour around each object in the raster image to generate a second file, wherein the cut contour is embedded using a specific color; and
  print the second file comprising the cut contour in the specific color embedded around each object; and
 a cutter configured to:
  receive the color information of the cut contour for each object;
  receive the printed file;
  scan the printed file to identify the cut contour in the specific color embedded around each object; and
  cut each object based on the identified cut contour for each object in order to retrieve each object individually.

19. The system of claim 18, wherein the printer is configured to generate a preview of the second file before printing.

20. The system of claim 18, wherein the printer is configured to display an option to the user to export the second file in a pre-defined format for editing.

* * * * *